United States Patent Office 2,890,472
Patented June 16, 1959

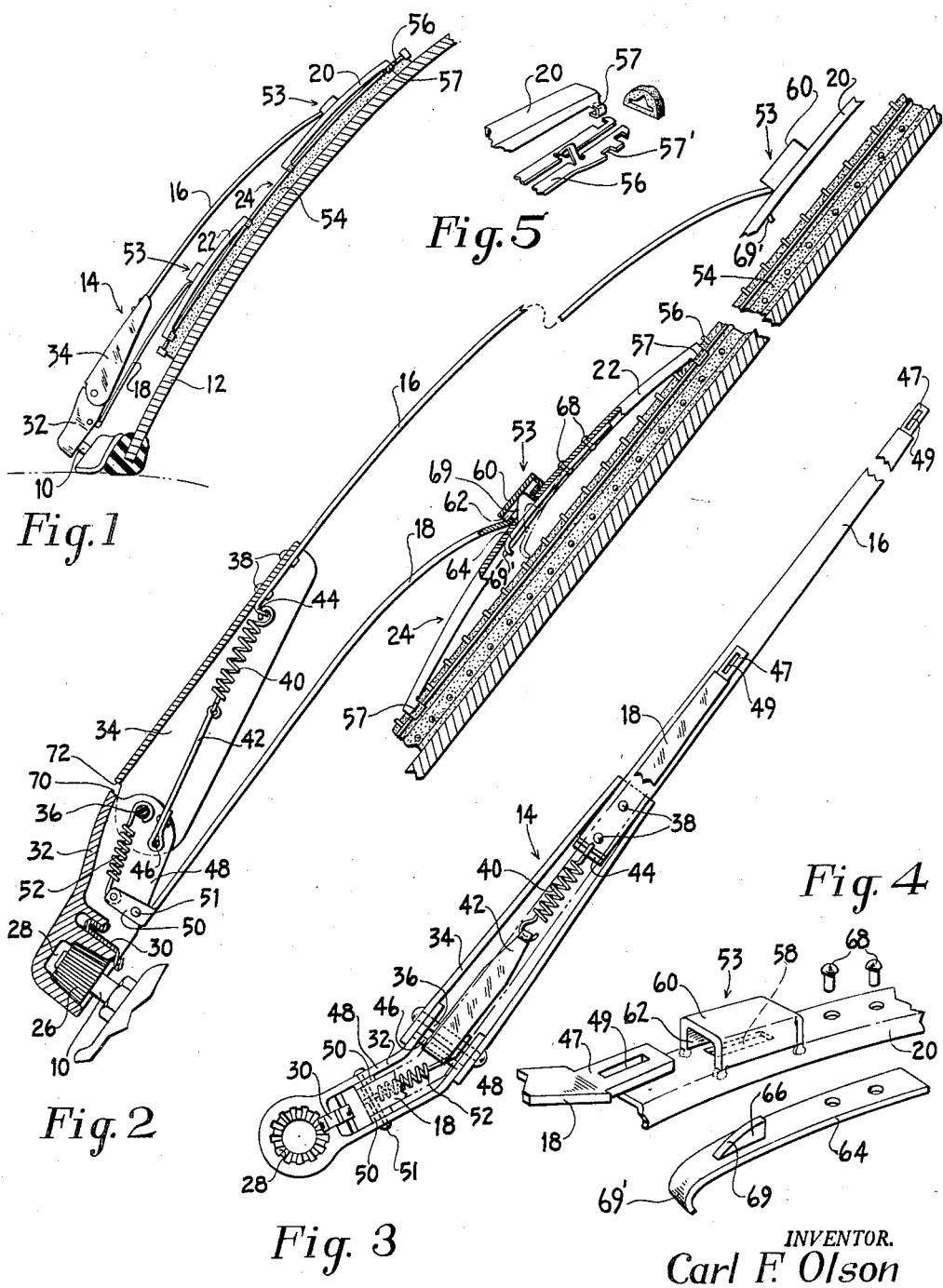

2,890,472
WINDSHIELD CLEANER

Carl F. Olson, Prince Rupert, British Columbia, Canada, assignor to Trico Products Corporation, Buffalo, N.Y.

Application April 21, 1955, Serial No. 502,851

14 Claims. (Cl. 15—255)

The present invention relates to the windshield cleaning art, and more particularly to windshield cleaners for efficiently wiping curved windshields.

Curved windshields currently in general use on automotive vehicles have irregularly curved surfaces including a curved but relatively flat frontal portion, and side portions having a curvature which is considerably more pronounced than the frontal section. One current type of curved windshield commonly known as the "wrap-around" or "panoramic" windshield, has a broad frontal portion of relatively slight curvature, side portions extending laterally to the frontal portion, and interconnecting corner bends of relatively extreme curvature blending the front and side portions into one continuous windshield surface. Consequently, in the wrap-around and like curved windshields, the wiper must reach around a corner to effectively wipe the curved extremities at the sides of the windshield.

Windshield cleaners heretofore used for such curved windshields generally comprise a flexible wiping squeegee or blade supported at a plurality of spaced points in a pressure-distributing, surface-conforming holder frame. The holder frame usually comprises a plurality of pressure distributing yokes or levers, including a so-called primary yoke by means of which the wiper is connected midway of its length to the end of a single actuating arm assembly. This single arm assembly is non-rotatably mounted on an oscillating drive shaft, and a spring means is supplied to urge an outer section of the arm about its pivot support towards the windshield to impose the desired wiping pressure on the wiper. Such prior windshield wiper arrangements are so constructed that the range of conformability of the wiper to changes in the windshield surface is substantially the same for both the inner and outer halves of the wiper. When the wiper sweeps over the relatively flat frontal section near the center of the windshield, the curvature of the windshield surface underlying the inner and outer halves of the wiper does not differ appreciably. When, however, the wiper traverses the side of the windshield, the curvature of the windshield section underlying the outer half of the wiper is considerably more pronounced than that underlying its inner half. As a result, such prior wiper arrangements do not function with full efficiency in wiping the curved extremities of wrap-around and like windshields and do not provide an even wiping action throughout the wiper stroke. In some instances, this imposes a practical limit on the maximum use of the windshield surface and thereby limits driver visibility during rain or other precipitation.

The present invention contemplates a new windshield cleaner arrangement for wrap-around and like curved windshields which incorporates a novel wiper arm and wiper pressure distributing arrangement whereby the wiper is conformable to the windshield surface over a broad range of change in curvature so that the wiper functions efficiently to wipe the curved extremities of such windshields.

It is therefore a principal object of the present invention to provide a windshield cleaner for wrap-around and like curved windshields which will efficiently wipe the curved extremities of the windshield, and will provide a more even wiping action throughout the wiping stroke.

It is another object of the present invention to provide for wrap-around and like curved windshields, a windshield cleaner having an oscillatory wiper arm assembly which supports a flexible surface-conforming wiper on a plurality of independent resilient wiper carrying arms whereby the wiper can conform to sections of the windshield having pronounced differences in curvature, as at the sides.

It is a releated object of the present invention to provide a windshield cleaner for wrap-around and like irregularity curved windshields having an oscillatory wiper arm assembly in which a flexible surface-conforming wiper is supported on a plurality of independently resilient wiper carrying arms each having separate pressure applying spring means to provide a more even wiping action.

It is still a further object of the present invention to provide a windshield cleaner for wrap-around and like windshields including a flexible surface-conforming wiper blade supported adjacent each end by a plurality of longitudinally spaced pressure-distributing yokes each of which is independently mounted on the outer end of one of a plurality of independently sprung wiper carrying arms of an oscillatory arm assembly, thereby achieving better conformity of the wiper to the windshield surface during wiper operation.

It is still a further object of the present invention to provide a windshield cleaner that will accomplish the foregoing objects and is of practical design and economical construction.

The foregoing and other objects will manifest themselves as this description progresses, reference being made therein to the accompanying drawings wherein:

Figure 1 is a side elevation of the improved windshield cleaner of the present invention in its operative position on a curved windshield;

Figure 2 is a fragmentary longitudinal sectional view of the improved windshield cleaner of the present invention;

Figure 3 is a bottom plan view of the wiper arm assembly of the improved windshield cleaner;

Figure 4 is an exploded perspective view of an improved coupling for securing the windshield wiper to the wiper carrying arms; and Figure 5 is an exploded perspective view of one of the interlocks between the backing strips and the yokes.

Referring to the drawings, the numeral 10 designates an oscillating cleaner drive shaft suitably journalled at the lower side of the vehicle windshield 12 and carrying a wiper arm assembly generally indicated at 14. Arm assembly 14 includes a resiliently supported outer arm 16 and a shorter inner arm 18, and each arm is connected at its end to one of the pressure-distributing yokes 20 and 22 respectively, of the windshield wiper generally indicated at 24.

The wiper arm assembly 14 is non-rotatably mounted on the forward end of shaft 10 by suitable means, such as cooperating grooved shaft head 26 and wiper arm socket 28, and a spring retaining clip 30 which engages the underside of head 26. The arm assembly 14 comprises an inner shaft mounted section 32 on which a channel-shaped intermediate section 34 is pivotally mounted by means of a pivot connection 36. The shaft mounted section 32 of arm assembly 14 is bent at an angle as shown in Figure 3 to permit the arms 16 and 18 and wiper 24 to clear the windshield molding and lie flush with the molding when the wiper is not in use.

The elongated outer wiper carrying arm 16 is in the form of a member that is secured at one end to the pivotal section 34 by suitable means, such as rivets 38. A suitable means is provided to impose wiping pressure on the outer end of arm 16 and the yoke 20 of wiper 24, and in the disclosed embodiment this means consists of joined tension spring 40 and strap 42, connected at one end to a lug 44 depending from the inward end of arm 16 and at the other end to a pin 46 supported by the sides 48 of the channel-shaped portion of shaft mounted section 32.

The inner short wiper arm 18 is likewise in the form of a member generally similar to long arm 16, but is bent adjacent its inner end at an angle corresponding to the angle of bend in the shaft mounted section 32. Short arm 18 is also provided at its inward end with a pair of ears 50 extending laterally from opposite sides of the short arm so that the arm has a U-shaped end portion. The arm is pivotally mounted on the shaft mounted section 32 by a pin connection 51 extending through ears 50. A suitable independent pressure applying means is provided for short arm 18, and in the embodiment shown a tension spring 52 is connected at one end to the pin of pivot connection 36 and at its other end to a pin supported by ears 50, so that spring 52 urges the free end of the short arm 18 towards the windshield to impose a wiping pressure on the inner wiping yoke 22 independently of the pressure imposed on wiper yoke 20 by the long arm 16 and spring 40.

The long arm 16 may be made of a piece of spring steel and is formed with an arcuate shape of sufficient curvature so that on assembly in a complete cleaner it has a greater curvature than the most pronounced curvature of the surface of the windshield with which it is used. In this way, the long arm can effectively reach around the curved extremity of the windshield and thus maintain wiping pressure on the outer section of the wiper even as it traverses the side windshield sections of greatest curvature. The short arm 18 need not be as flexible as long arm 16, but may be made of spring steel having some measure of resilience. Arm 18 is arcuate but is formed with only a relatively small curvature compared to that of arm 16, since the curvature of arm 18 is provided principally to ensure that it clears the windshield molding at all times. As will be seen from Figure 3, both arms 16 and 18 are tapered to give greater lateral strength and stability at their point of attachment to sections 34 and 32, respectively. Each arm 16 and 18 is provided with a reduced flat rectangular end section 47 having a rectangular slot 49 which form part of the coupling means, generally indicated at 53, for securing wiper yokes 20 and 22 to the wiper arms 16 and 18.

In a preferred embodiment as disclosed in the drawings, wiper 24 comprises a flexible squeegee or blade 54 made of rubber, or like plastic flexible material, and blade 54 is loosely supported in a flexible metal backing strip 56 that is in turn retained in holding claws 57 extending from the sides of yokes 20 and 22. Preferably, the backing strip 56 is retained in a fixed position by engaging a claw 57 of yoke 20 in a notch 57' of the backing strip, the strip being slidingly retained by both ends of the other yoke. This permits relative movement between the latter yoke and the blade 54 to compensate for slight changes in the distance between the ends of long and short arms 16 and 18 due to changes in the windshield curvature traversed by the wiper during wiper operation.

Referring to the coupling generally indicated at 53, each of the yokes 20 and 22 has a rectangular slot 58 at its central portion, and a small rectangular enclosure 60 having an open end 62 is mounted by suitable means on the web of the yoke over slot 58. A small flat spring 64 provided with a pawl 66 extending laterally from one side thereof is suitably secured at one end to the underside of the yoke web, as by rivets 68. The pawl 66 projects through yoke slot 58 into the enclosure 60. Openings 62 and pawl cam surfaces 69 face in the same direction on both wiper yokes to facilitate assembly of the wiper 24 on the two wiper carrying arms 16 and 18. The wiper 24 is mounted on the wiper arm assembly 14 by simply inserting the slotted end sections 47 of wiper carrying arms 16 and 18 into the openings 62 of enclosures 60 on the respective yokes 20 and 22. This depresses the pawls 66 until they snap into arm slots 49 under the resilient action of the springs 64, thereby securely coupling each yoke to its arm and positioning the wiper 24 on its dual arm mount.

As shown in Figure 2, slot 49 is slightly elongated to provide for some longitudinal float in the coupling 53 between the individual arms and their yokes. The size of the rectangular arm extensions 47 and inside dimensions of yoke coupling enclosures 60 may be proportioned to control movement between wiper arms and the yokes when assembled within the limits desired. Instead of enclosure 60, the coupling 53 may have a similar functioning retaining means to keep arm section 47 in proximate relation with the web of the wiper yoke to maintain coupling.

A spring leaf 64 is also provided with a bend at its free end forming a laterally extending lug 69'. This facilitates insertion of a tool such as a screw driver between the underside of the yoke and the spring to depress it to the dotted line position shown in Figure 3 and withdraw pawl 66 from the slots 49 of the wiper carrying arms. The wiper yokes 20 and 22 are therefore easily removable from the wiper arms 16 and 18 for wiper replacement or the like.

Coupling 53 is particularly suitable for use with a wiper arm assembly like 14 having a dual arm wiper carrier because it permits assembly or removal of the wiper by a simple longitudinal sliding movement between the yokes and the carrying arms, whereas, a clip requiring an arcuate or other complex motion for effecting coupling and decoupling therebetween would be much less suitable for a multiple arm wiper assembly. This feature of coupling 53 is of course also advantageous in windshield cleaners having a single wiper carrying arm. Further, coupling 53 is of very simplified but effective design making it inexpensive to produce and easy to assemble, and these are factors of great importance in the windshield cleaner field.

In operation, when arm assembly 14 is oscillated across the surface of a wrap-around windshield 12, the outer end portion of the wiper supported by the yoke 20 sweeps over a surface having pronounced changes of curvature, particularly at the windshield extremities. When the wiper is at the side of the windshield, the longer arm 16, because of its inherent resiliency, tends to assume its preassembled arcuate shape for maintaining pressure on the outer yoke 20 and the outer portion of wiper 24 so that it effectively conforms to the windshield at its greatest curvature. At the same time, pressure is independently applied to the inner yoke 22 by the pivoted and preferably resilient shorter arm 18 through the functioning of its independent pressure applying spring 52 to maintain the inner end portion of the wiper 24 in effective wiping contact with the windshield surface. The use of independent resilient mountings and individual pressure springs for the wiper yokes achieves better conformity of the wiper to the windshield curvature and a more even wiping action throughout the wiper stroke. The edges 70 and 72 on sections 32 and 34, respectively, of the arm assembly 14 constitute abutting shoulders to limit the outward counterclockwise rotation of pivotal section 34 and arm 16 to the extent desired.

From the foregoing, it will be apparent that the present invention provides a windshield cleaner for wraparound and like curved windshields including a novel wiper arm assembly and wiper pressure distributing arrangement so that the cleaner effectively wipes the curved extremities of such windshields and provides a more uniform wiping action throughout the wiper stroke; and that the present invention further provides an improved coupling means for connecting a wiper to a wiper arm, which is particularly suitable for the multiple arm wiper carrying assembly of the present invention.

The dual arm support for the wiper provides the required spring pressure to the outer end of the blade or wiper to conform it to the compound curvature about the corner. This is accomplished herein by the normally curved longer arm which by reason of its inherent resiliency, supplemented by its coil spring 40, is capable of reaching around the curved contour to wipe the lateral portion of the shield heretofore presenting a blind zone. This longer arm is preferably formed of a piece of spring steel of sufficient strength which, in a relaxed condition, forms a curve great enough to maintain pressure on the wiper at the point of greatest curvature of the windshield surface to be wiped. Through the equalizing action of the yokes or rockers 20 and 22, it will wipe the extremities of the wrap-around windshield by the pressure supplied through the inherent resiliency of the arm at the greatest curvature of the surface along the outer end portion of the wiper, aided or supplemented by the augmented pressure provided by the coil spring. The shorter arm may be formed from a more rigid steel stock with only enough spring to provide a measure of resilience sufficient to maintain the wiping contact with the less pronounced curvatures occurring at the lower side of the windshield adjacent the wiper actuating shaft 10.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A windshield wiper arm assembly comprising a mounting section adapted to be mounted on a drive shaft, an intermediate section pivotally connected to said mounting section for movement toward and away from an associated windshield, an elongated resilient wiper carrying arm connected to and extending forwardly from said intermediate section, an independent shorter wiper carrying arm pivotally mounted on said mounting section inwardly from and extending in the same general direction as said elongated arm for movement toward and away from an associated windshield, the free ends of said arms being longitudinally spaced from each other, said free ends being adapted for attachment to a wiper adjacent opposite ends thereof, and spring means acting to impose a wiping pressure on the two arms for independent action upon a connected wiper at its opposite ends.

2. A windshield cleaner for use with a wrap-around type windshield having a relatively broad frontal section, side portions extending laterally thereto, and interconnecting sections of pronounced curvature forming a windshield corner at each extremity, comprising a mounting section adapted to be mounted on a drive shaft, an intermediate section pivotally connected to said mounting section for movement toward and away from the surface of an associated windshield, an arcuate resilient wiper carrying arm connected to and extending forwardly from said intermediate section, said arm having a greater arc in normal unrestrained condition than the most pronounced curvature of the associated windshield at its corner for reaching around the corner, a shorter resilient wiper carrying arm mounted on and extending forwardly from said mounting section inside of said elongated arm, a pressure equalizing rocker for each arm pivoted on the outer end thereof, and a wiping blade carried by the rockers.

3. A wiper arm assembly comprising a mounting section adapted to be mounted on a drive shaft, an intermediate section pivotally connected to said mounting section for movement toward and away from the surface of an associated window, an arcuate resilient elongated arm fixed to said intermediate member and projecting outwardly therefrom and having a free end adapted to support a wiper adjacent one end thereof, a second shorter resilient arm on said mounting section extending outwardly therefrom independently of said elongated arm and having a free end adapted to support such a wiper adjacent its opposite end, a first coil spring means for urging the free end of the elongated arm towards the surface to be wiped to impose wiping pressure on the adjacent portion of the wiper, and a second coil spring means for independently urging the free end of the short arm towards the surface to be wiped to impose wiping pressure on the adjacent portion of the wiper.

4. A cleaner for windshields having a curved surface, comprising a wiper arm assembly adapted to be non-rotatably mounted on an actuating shaft, said assembly including a plurality of resilient arms bodily movable toward and away from the surface of an associated windshield independently of each other and extending in the same general direction with the free ends of said arms longitudinally spaced from each other, a flexible surface-conforming wiper including a plurality of longitudinally spaced pressure distributing members, there being one member for each arm, and means for independently coupling each of said members to the free end of one of said arms.

5. A cleaner for wrap-around and like curved windshields, comprising a wiper arm assembly adapted to be non-rotatably mounted on an actuating shaft, said assembly including an elongated resilient wiper carrying arm and a shorter resilient wiper carrying arm extending in the same general direction with their free ends longitudinally spaced from each other, means independently mounting said arms on said assembly for movement independently of each other toward and away from the surface of an associated windshield, and a flexible surface-conforming wiper supported by the free ends of said arms at longitudinally spaced points.

6. A cleaner for a windshield having a curved surface, comprising a wiper arm assembly including a mounting section adapted to be mounted on a drive shaft, an elongated wiper carrying arm pivotally mounted on and extending from said mounting section for movement toward and away from the surface of an associated windshield, and an independent shorter wiper carrying arm also pivotally mounted on said section for movement toward and away from the surface of an associated windshield and extending in the same general direction as said elongated arm, the free ends of said arms being spaced lengthwise from each other, a flexible surface-conforming wiper including a flexible wiping blade and longitudinally spaced pressure distributing members adjacent each end thereof, there being one member for each arm, and means independently coupling said members to the respective free ends of said arms so that the opposite ends of the wiper are independently supported on the wiper arm assembly.

7. A cleaner for a windshield having a curved surface, comprising a wiper arm assembly including a mounting section adapted to be mounted on a drive shaft, an elongated arcuate wiper carrying arm and an independent shorter wiper carrying arm each pivotally connected to and extending from said mounting section for movement toward and away from the surface of an associated windshield, a flexible surface-conforming wiper including a flexible wiping blade supported in a flexible backing strip held by a pair of longitudinally spaced pressure distributing yokes adjacent each end thereof, means independently coupling said yokes to the free ends of said arms so that the opposite ends of the wiper are independently supported on the wiper arm assembly, one of said yokes being fixed in position on said backing strip and the other of said yokes slidably holding said strip so that the spacing between the yokes is adjustable during wiper operation.

8. A cleaner for curved windshields, comprising a mounting section adapted to be non-rotatably mounted on a drive shaft, an elongated wiper carrying arm and an independent shorter wiper carrying arm both independently pivotally mounted on said section for movement toward and away from the surface of an associated windshield and extending therefrom in the same general direction, a coupling portion at the free end of each of said arms, a flexible surface conforming wiper including a flexible wiping blade supported in longitudinally spaced pressure distributing yokes adjacent each end of the wiper, and coupling means on said yokes to connect the same to said coupling portions on the wiper carrying arms.

9. A windshield cleaner for curved windshields, comprising a wiper arm assembly including a mounting section and independently and pivotally mounted long and short wiper carrying arms carried thereby for movement toward and away from the surface of an associated windshield and extending in the same general direction with their free ends longitudinally spaced from each other, a flexible surface-conforming wiper including a flexible wiping blade and longitudinally spaced pressure distributing yokes one for each arm, means coupling said members to the free ends of said arms, first spring means acting between the mounting section and said long wiper arm for urging the latter about its pivot towards the surface to be wiped to impose a wiping pressure through its wiper pressure distributing member to the adjacent portion of the blade, and second spring means acting between the mounting section and said short arm for urging the latter about its pivot towards the surface to be wiped to independently impose wiping pressure through its pressure distributing member to the adjacent portion of the blade.

10. A windshield cleaner for wrap-around and like windshields having a relatively flat curved frontal portion with pronounced curves at the lateral extremities thereof joining to side areas, comprising an oscillatory drive shaft, a shaft mounted arm section non-rotatably mounted on said shaft, a surface-conforming elongated wiper including a flexible squeegee supported in a flexible pressure distributing wiper frame, and means including independently operable levers pivoted on said arm section for movement toward and away from the surface of an associated windshield and supporting the opposite end portions of said wiper for differential movement therefrom for conforming the wiper to changing windshield curvatures during wiper operation, one lever having an outer end of greater curvature than the curved extremity of the windshield to effectively wipe a side area of the windshield.

11. A windshield cleaner for curved windshields, comprising an oscillatory drive shaft, a wiper arm assembly non-rotatably mounted on said shaft, said assembly including an elongated resilient wiper carrying arm and a shorter resilient wiper carrying arm extending in the same general direction with the free ends of said arms spaced from each other, said arms being independently pivoted for movement toward and away from an associated windshield surface, a surface conforming wiper supported by said arms at longitudinally spaced points adjacent opposite ends of the wiper, and supplemental spring means acting upon the two arms to conform the wiper to a surface being wiped.

12. A windshield cleaner for curved windshields, comprising an oscillatory drive shaft, an inner arm section non-rotatably mounted on said drive shaft, an intermediate arm section pivotally connected to said inner section for movement toward and away from the surface of an associated windshield, a dual outer arm section having long and short independently operable levers connected to and extending from said intermediate section and said inner section respectively with the free ends of said levers being spaced from each other, a flexible surface conforming wiper including a flexible wiping blade and longitudinally spaced pressure equalizing yokes one adjacent each end of the wiper, and means for independently coupling each of said yokes to the free end of a respective one of said levers so that the opposite ends of the wiping blade are independently supported on the wiper arms.

13. A windshield cleaner for curved windshields, comprising an oscillatory drive shaft, a wiper arm assembly including a first section non-rotatably mounted on said drive shaft, an intermediate section pivotally connected to said first section for movement toward and away from the surface of an associated windshield, an elongated resilient wiper carrying arm connected to and extending from said intermediate section, and an independent shorter resilient wiper carrying arm mounted on said first section extending in the same direction as said elongated arm, the free ends of said arms being spaced from each other, a flexible surface-conforming wiper including a flexible wiping blade supported in a flexible backing strip held by a pair of longitudinally spaced pressure distributing yokes adjacent each end thereof, and means for independently coupling said yokes to the free ends of said arms so that the opposite ends of the wiper are independently supported on the wiper arm assembly, one of said yokes being fixed in position on said backing strip and the other of said yokes slidably holding said strip so that the spacing between the yokes is adjustable during wiper operation.

14. A windshield cleaner having a wiper carrying arm comprising a mounting head mountable upon a rockshaft and plural independently operable levers pivoted as spaced points on the head for movement toward and away from the surface of an associated windshield, a flexible wiping blade supported at its opposite ends by the outer ends of the levers, and coiled spring means connected to the levers and acting thereon to rotate them in one direction about their pivots for separately applying wiping pressure to the opposite end portions of the blade.

References Cited in the file of this patent

UNITED STATES PATENTS

| | | |
|---|---|---|
| 1,947,013 | Lauchin | Feb. 13, 1934 |
| 2,250,331 | Horton | July 22, 1941 |
| 2,649,605 | Scinta et al. | Aug. 25, 1953 |
| 2,694,827 | Bacher | Nov. 23, 1954 |
| 2,747,213 | Oishei | May 29, 1956 |
| 2,751,620 | Ehrlich | June 26, 1956 |
| 2,608,241 | Oishei | Sept. 17, 1957 |